(No Model.)
H. A. BARROWS & R. F. CUMMINGS.
OILER FOR CAR WHEELS.
No. 286,762. Patented Oct. 16, 1883.
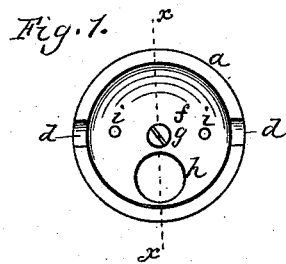
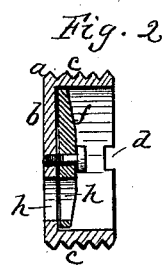
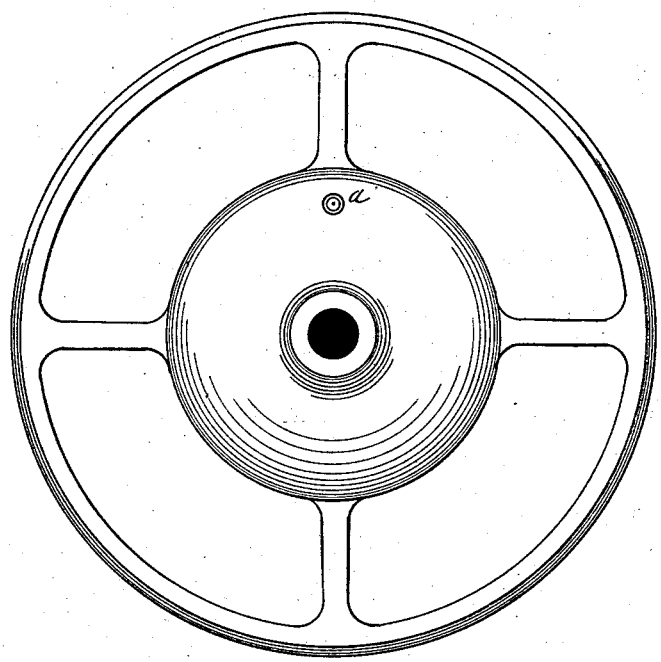
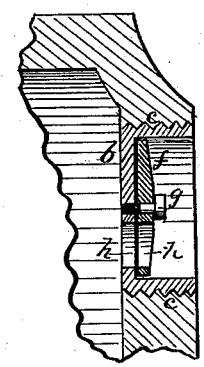
Attest.
Paris G. Clark
R. E. White
Inventors.
Howard A. Barrows
Robt F. Cummings,
per R. F. Osgood,
atty.

UNITED STATES PATENT OFFICE.

HOWARD A. BARROWS, OF ROCHESTER, NEW YORK, AND ROBERT F. CUMMINGS, OF LANDRUS, PENNSYLVANIA.

OILER FOR CAR-WHEELS.

SPECIFICATION forming part of Letters Patent No. 286,762, dated October 16, 1883.

Application filed April 13, 1883. (No model.)

*To all whom it may concern:*

Be it known that we, HOWARD A. BARROWS, of Rochester, Monroe county, New York, and ROBERT F. CUMMINGS, of Landrus, Tioga county, Pennsylvania, have invented a certain new and useful Improvement in Oilers; and we do hereby declare that the following is a full, clear, and exact description of the same, reference being had to the accompanying drawings, in which—

Figure 1 is a plan of the device. Fig. 2 is a cross-section of the same in line *x x* of Fig. 1. Fig. 3 is a side elevation of a car-wheel with the device applied thereto. Fig. 4 is a cross-section of a portion of the wheel, showing the device inserted therein.

Our improvement relates to oilers for car-wheels, and is of that kind where the cup is set into the side of the wheel and remains a permanent attachment thereto.

The invention consists, as an improved article of manufacture, of a hollow cup open on its outside, closed on its inside, and threaded on its periphery, forming, in effect, a screw-nozzle, which can be screwed into the side of the wheel, so that its outer rim will stand flush, and having in its interior a pivoted disk capable of being turned around to different positions, the disk and the bottom of the cup having coincident holes, through which the oil can be poured, all as hereinafter described.

In the drawings, *a* shows the cup. This cup is open on the outside, but has a closed bottom, *b*, and on its periphery is a screw-thread, *e*. In this form the device is to be screwed into a socket in the side of the car-wheel till its outer edge stands flush with or is sunken below the surface of the wheel, as shown in the cross-section, Fig. 4. The device is screwed in by means of a suitable wrench, which fits in notches *d d* in the outer edge of the cup.

*f* is a disk, which fits closely in the bottom of the cup, and turns upon a screw, *g*, which forms the pivot. The disk and the bottom of the cup are provided with coincident holes *h h*, of sufficient size to allow the insertion of the spout of an oil-can, to pour the oil. When the disk is turned in one position, the holes come in coincidence; when it is turned in the other position, they are separated, and the cup is closed. The disk is turned by a suitable wrench applied in small cavities *i i* in the face of the disk.

We are aware that a turning disk provided with an oil-hole which turns to open and close the passage to the wheel is known, and such, broadly, we do not claim.

The novel feature of our invention consists of the cup or plug, open on its outside, closed at its bottom to receive the interior disk, and threaded on its periphery, the whole so arranged that the plug can be screwed into the side of the wheel so that it stands flush with the outer surface. By this means the exterior of the wheel has no projection formed by the oil-cup. The cup has a hollow cavity, which receives and incloses the disk and shields it from harm.

This device is adapted to car-wheels of various forms, but is specially adapted to the wheels of mining-cars, which are of small size, and have a hollow hub intended particularly for holding a quantity of oil for lubricating the axle. Such cars are not provided with brakes; but "sprags" or short pieces of wood are inserted between the spokes and under the body of the car, to arrest motion, thus causing the wheels to slide and check the speed, and if the oiler projects, it is liable to injury; but, being set in, it is safe from accidental violence.

Having described our invention, we claim—

As an improved article of manufacture, an oiler for car-wheels, consisting of a cup open on its outside, closed at its bottom, and provided with threads on its periphery for screwing into the side of the wheel, said cup provided at its bottom with a turning disk, and the disk and the bottom of the cup provided with coincident holes for the insertion of oil, as set forth.

In witness whereof we have hereunto signed our names in the presence of two subscribing witnesses.

HOWARD A. BARROWS.
ROBERT F. CUMMINGS.

Witnesses:
J. T. CORBIN,
W. S. KERSHNER.